US010669927B2

(12) United States Patent
Rao et al.

(10) Patent No.: US 10,669,927 B2
(45) Date of Patent: Jun. 2, 2020

(54) FLUID RECIRCULATION TURBINE SYSTEM

(71) Applicant: Honeywell International Inc., Morris Plains, NJ (US)

(72) Inventors: Kiran.S Rao, Bangalore (IN); Kiran Pithamber, Bangalore (IN); Hasham Hamzamiyan Chougule, Mumbai (IN)

(73) Assignee: Garrett Transportation I Inc., Torrance, CA (US)

(*) Notice: Subject to any disclaimer, the term of this patent is extended or adjusted under 35 U.S.C. 154(b) by 190 days.

(21) Appl. No.: 15/826,679

(22) Filed: Nov. 30, 2017

(65) Prior Publication Data
US 2019/0162113 A1 May 30, 2019

(51) Int. Cl.
| | | |
|---|---|---|
| *F02B 37/18* | (2006.01) | |
| *F01D 17/10* | (2006.01) | |
| *F01D 5/04* | (2006.01) | |
| *F01D 9/02* | (2006.01) | |
| *F01D 3/04* | (2006.01) | |
| *F01D 17/14* | (2006.01) | |
| *F01D 25/24* | (2006.01) | |

(52) U.S. Cl.
CPC .............. *F02B 37/183* (2013.01); *F01D 3/04* (2013.01); *F01D 5/043* (2013.01); *F01D 9/026* (2013.01); *F01D 17/105* (2013.01); *F01D 17/145* (2013.01); *F01D 5/048* (2013.01); *F01D 25/24* (2013.01); *F05D 2220/40* (2013.01); *F05D 2250/71* (2013.01); *F05D 2260/606* (2013.01)

(58) Field of Classification Search
CPC ........ F01D 17/105; F01D 17/145; F01D 3/04; F01D 5/043; F01D 5/048; F01D 9/026; F01D 25/24; F02B 37/183; F05D 2220/40; F05D 2250/71; F05D 2260/606
USPC ........................................................ 60/602
See application file for complete search history.

(56) References Cited

U.S. PATENT DOCUMENTS

2017/0350252 A1* 12/2017 Wengert ................... F01D 3/04

FOREIGN PATENT DOCUMENTS

DE        10 2014 226 951      * 6/2016

* cited by examiner

*Primary Examiner* — Thai Ba Trieu
*Assistant Examiner* — Dapinder Singh
(74) *Attorney, Agent, or Firm* — The Law Office of John A. Griecci

(57) ABSTRACT

A rotor rotatably mounted within a turbocharger housing includes a turbine wheel and a shaft. The shaft connects the turbine wheel. The hub defines a turbine-wheel back-disk surface facing the portion of the housing containing the bearings, and the hub defines a blade-side surface. The turbine hub and the housing define a turbine-wheel back-disk cavity. The turbine hub forms a ring-shaped primary axial protrusion extending circularly around the turbine-wheel back-disk surface into a circular channel in the housing. The circular channel leads into a bypass that bypasses the turbine blades. A relief flow valve is placed in the bypass. The relief control valve is controlled to open when the bypass pressure is above a cutoff pressure, and close when it is below the cutoff pressure.

16 Claims, 6 Drawing Sheets

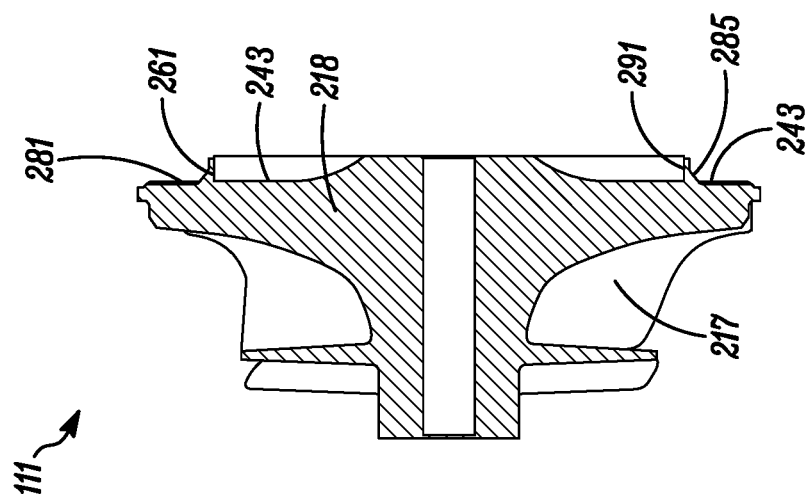
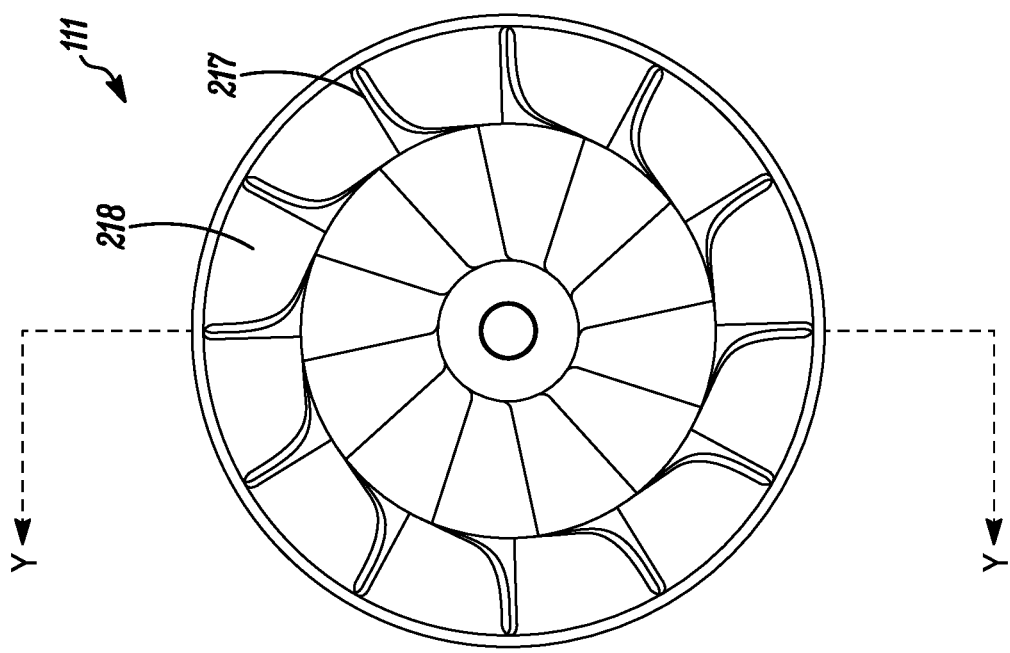
FIG. 5
FIG. 4

FLUID RECIRCULATION TURBINE SYSTEM

The present invention relates generally to turbochargers and, more particularly, to a turbine having a recirculatory system directed to reduce the axial loads generated by turbocharger wheel portions.

BACKGROUND OF THE INVENTION

With reference to FIG. 1, a typical turbocharger 101 has a turbine that includes a turbocharger housing and a rotor configured to rotate within the turbocharger housing around an axis of rotor rotation 103 on oil-lubricated thrust bearings and two sets of oil-lubricated journal bearings (one for each respective rotor wheel), or alternatively, other similarly supportive bearings. The turbocharger housing includes a turbine housing 105, a compressor housing 107, and a center housing 109 (i.e., a bearing housing that contains the bearings) that connects the turbine housing to the compressor housing. The rotor includes a turbine wheel 111 located substantially within the turbine housing, a compressor wheel 113 located substantially within the compressor housing, and a shaft 115 extending along the axis of rotor rotation, through the center housing, to connect the turbine wheel to the compressor wheel.

The turbine housing 105 and turbine wheel 111 form a turbine configured to circumferentially receive a high-pressure and high-temperature exhaust gas stream 121 from an engine, e.g., from an exhaust manifold 123 of an internal combustion engine 125. The turbine wheel (and thus the rotor) is driven in rotation around the axis of rotor rotation 103 by the high-pressure and high-temperature exhaust gas stream, which becomes a lower-pressure and lower-temperature exhaust gas stream 127 and is axially released into an exhaust system (not shown).

The compressor housing 107 and compressor wheel 113 form a compressor stage. The compressor wheel, being driven in rotation by the exhaust-gas driven turbine wheel 111, is configured to compress axially received input air (e.g., ambient air 131, or already-pressurized air from a previous-stage in a multi-stage compressor) into a pressurized air stream 133 that is ejected circumferentially from the compressor. Due to the compression process, the pressurized air stream is characterized by an increased temperature over that of the input air.

Optionally, the pressurized air stream may be channeled through a convectively cooled charge air cooler 135 configured to dissipate heat from the pressurized air stream, increasing its density. The resulting cooled and pressurized output air stream 137 is channeled into an intake manifold 139 on the internal combustion engine, or alternatively, into a subsequent-stage, in-series compressor. The operation of the system is controlled by an ECU 151 (engine control unit) that connects to the remainder of the system via communication connections 153.

It is desirable to limit axial loads on the rotor to minimize the size and cost of the axial bearings, while maximizing their reliability. One way to do this is to use two-sided wheels. Other means are also known to those of skill in the art.

For turbines, one cause of axial loads is the leaking of radially (and circumferentially) supplied high-pressure exhaust gas from the inducer of the turbine around to a back-disk area of a turbine wheel. This leaked high-pressure exhaust gas behind the turbine wheel can place axial loads on the wheel that far exceed the axial forces of the exhaust gas that passes through an exducer of the radial turbine.

Accordingly, there has existed a need for a turbocharger turbine minimizing high and low pressure flow in back-disk regions behind radial turbines and radial compressors. Preferred embodiments of the present invention satisfy these and other needs, and provide further related advantages.

SUMMARY OF THE INVENTION

In various embodiments, the present invention solves some or all of the needs mentioned above, typically providing a cost-effective turbocharger turbine characterized by a turbine configured to receive a pressurized exhaust gas stream, and to convert its total energy into mechanical kinetic energy. The turbine includes a housing forming a scroll directing the exhaust gas stream inward toward an axis of rotor rotation.

A rotor rotatably mounted within the turbocharger housing rotates around the axis of rotor rotation, and includes a turbine wheel and a shaft extending along the axis of rotor rotation. The shaft connects the turbine wheel to bearings within a portion of the housing. The turbine wheel is configured with a hub and a plurality of turbine blades. The hub defines a turbine-wheel back-disk surface facing the portion of the housing containing the bearings, and the hub defines a blade-side surface.

The turbine hub forms an axially-extending wheel gap radially between the blade-side surface and the housing that allows a small amount of flow between inlet exhaust gas and the area behind the hub. The turbine hub defines a turbine-wheel back-disk surface facing the housing, and the housing defines a turbine-end wall having an outer surface facing the turbine hub, a turbine-wheel back-disk cavity being defined between the turbine-wheel back-disk surface and the turbine-end-wall outer surface.

The turbine hub forms a ring-shaped primary axial protrusion extending circularly around the turbine-wheel back-disk surface into a circular channel in the housing, separating the back-disk surface into an outer back-disk surface region and an inner back-disk surface region. The primary axial protrusion also separates the turbine-wheel back-disk cavity into an outer back-disk cavity and an inner back-disk cavity. The circular channel leads into a bypass that bypasses the turbine blades.

Using this primary axial protrusion and the bypass, lower axial loads may be achieved. The lower axial loads help in providing better choices for bearing systems in designing turbines and turbochargers, and in improving the bearing life. They also help in simplifying the sealing arrangement at the back disc of a turbine (or compressor wheel if so applied).

In another feature of the invention, a relief flow valve is placed in the bypass. The relief control valve is controlled by a controller maintaining a constant positive pressure in the bypass throughout most of operating conditions of the turbine. Typically, the controller of the relief flow valve in the bypass opens relief control valve when the bypass pressure within the bypass is above a cutoff pressure, and closes when the bypass pressure is below the cutoff pressure. Advantageously, this maintains bypass pressures that minimize axial loads and oil leaks.

BRIEF DESCRIPTION OF THE DRAWINGS

FIG. 4 is a side view of a turbine wheel depicted in FIG. 2.

FIG. 5 is a cross-sectional front view of the turbine wheel depicted in FIG. 4.

DETAILED DESCRIPTION OF THE PREFERRED EMBODIMENTS

The invention summarized above and defined by the enumerated claims may be better understood by referring to the following detailed description, which should be read with the accompanying drawings. This detailed description of preferred embodiments of the invention, set out below to enable one to build and use particular implementations of the invention, is not intended to limit the enumerated claims, but rather, it is intended to provide particular examples of them.

Typical embodiments of the present invention reside in a motor vehicle equipped with a gasoline powered internal combustion engine and a turbocharger. The turbocharger is equipped with unique elements that may reduce the longitudinal (i.e., axial) pressure asserted by exhaust gas leakage from an exhaust gas stream to a back-disk area of a turbine wheel.

Figure 1:
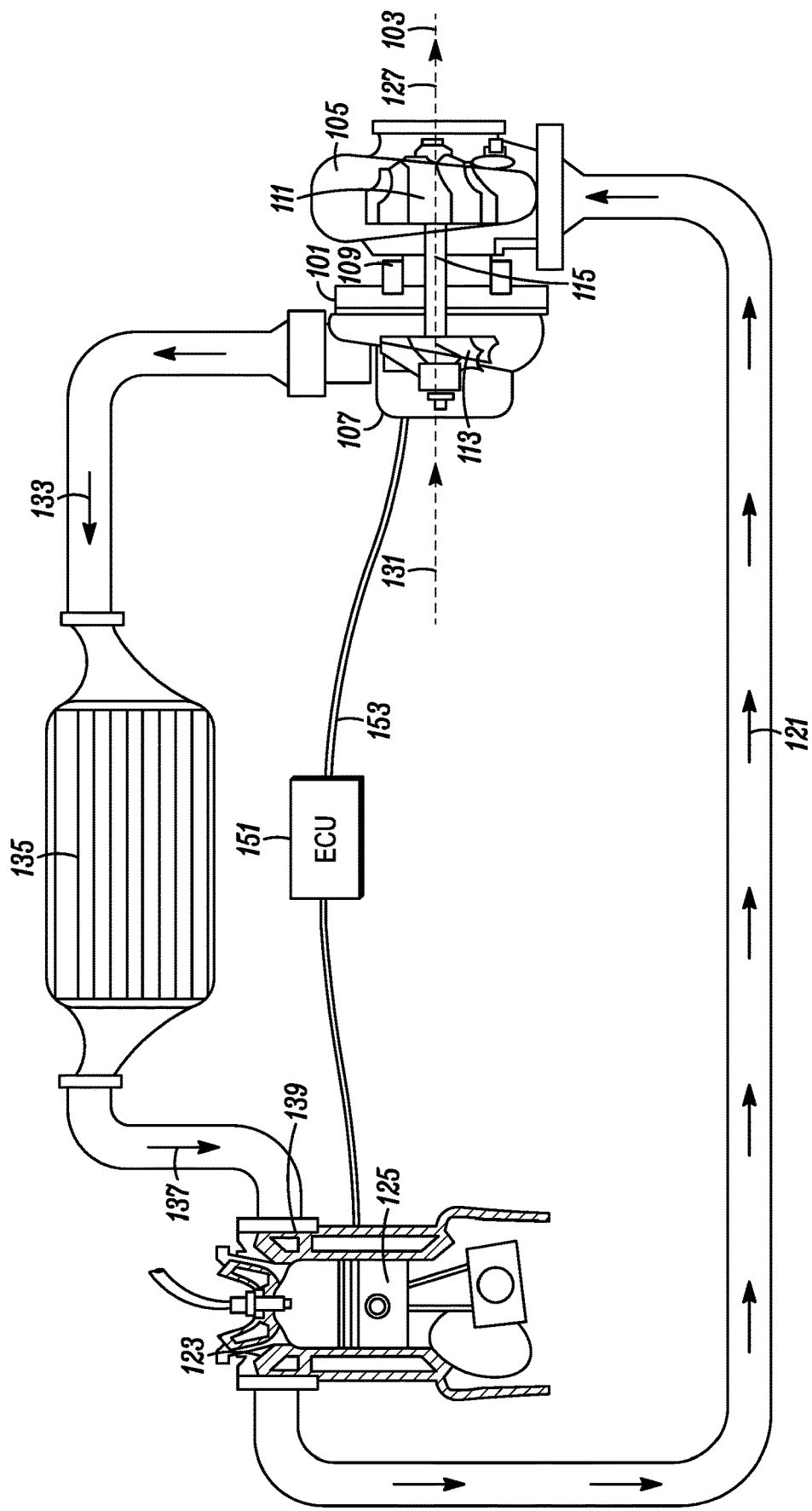
FIG. 1 is a system view of a prior art turbocharged internal combustion engine.
Figure 2:
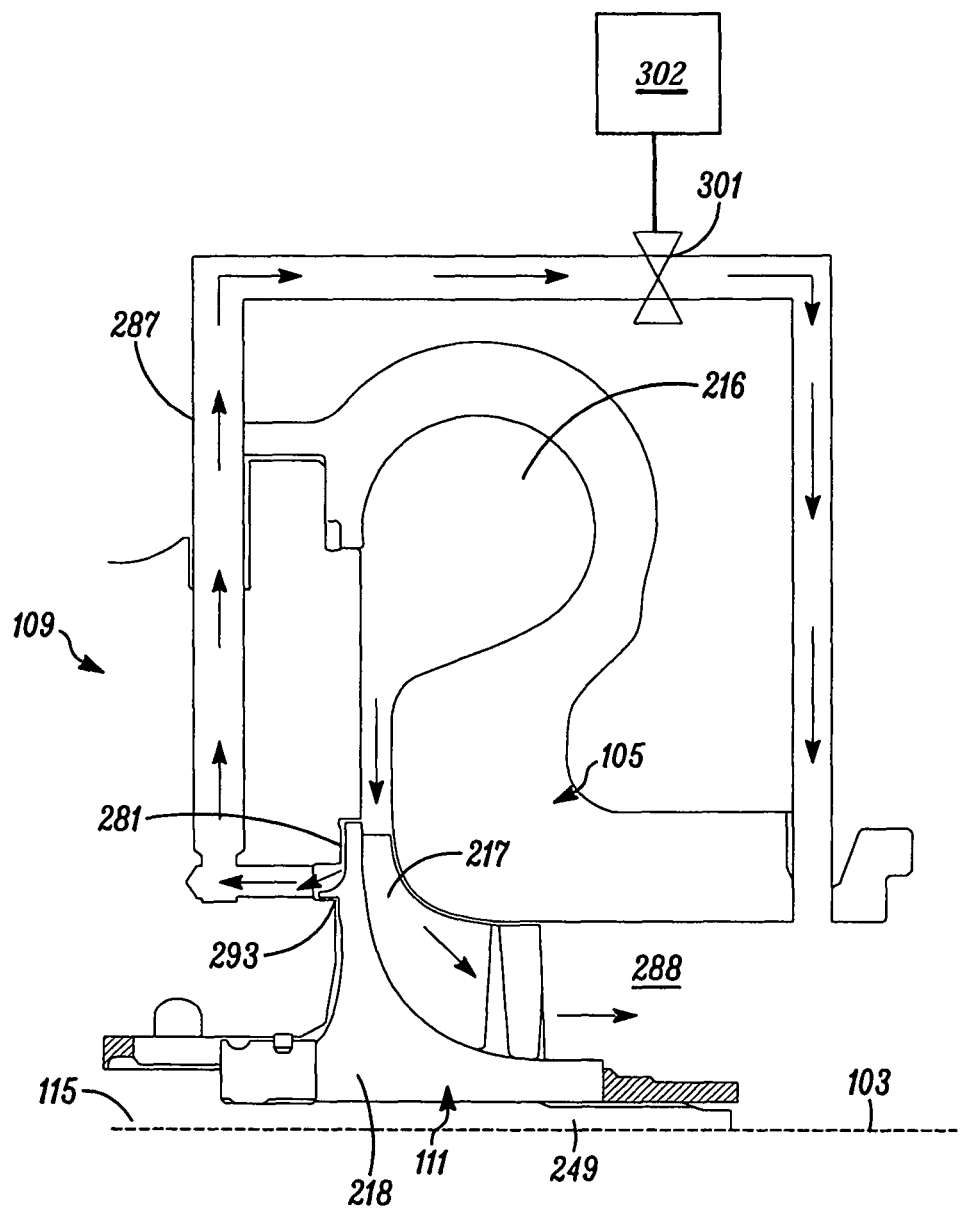
FIG. 2 is a schematic partial view of a turbine embodying the present invention.
Figure 3:
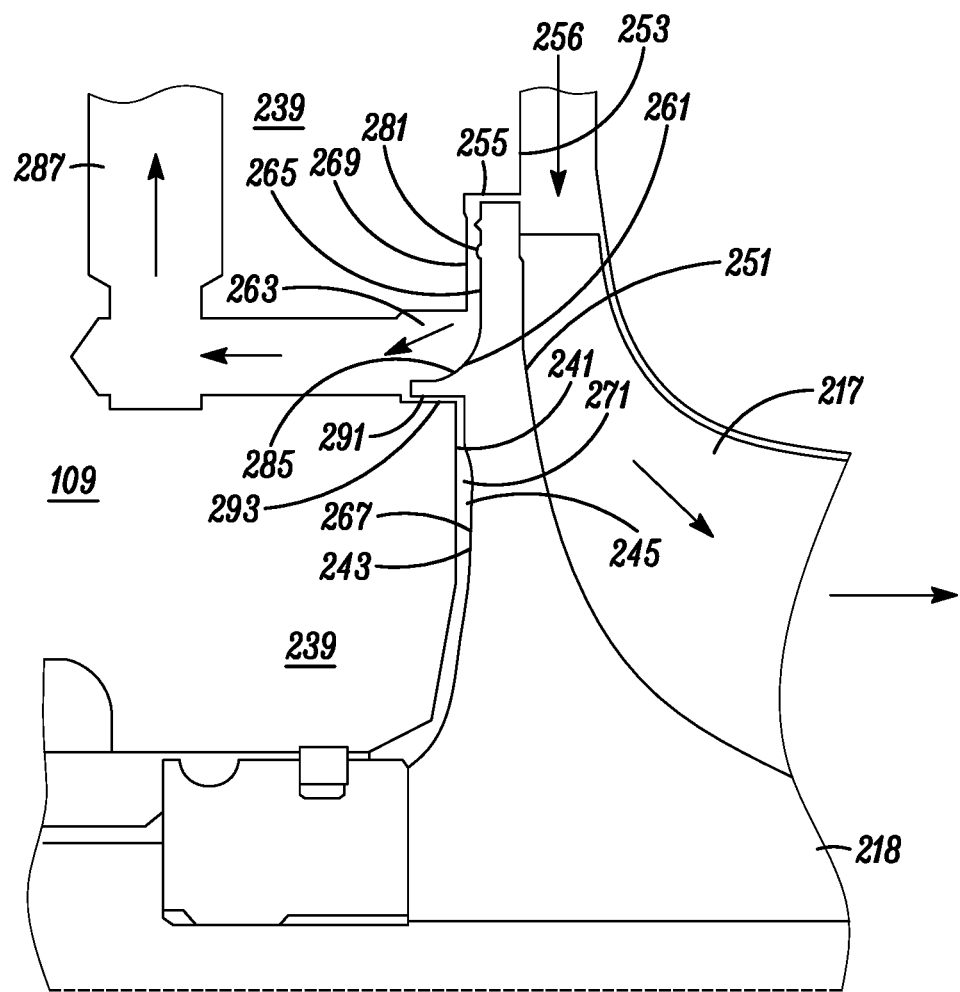
FIG. 3 is a partial cross-sectional view of the turbine depicted in FIG. 2.
Figure 6:
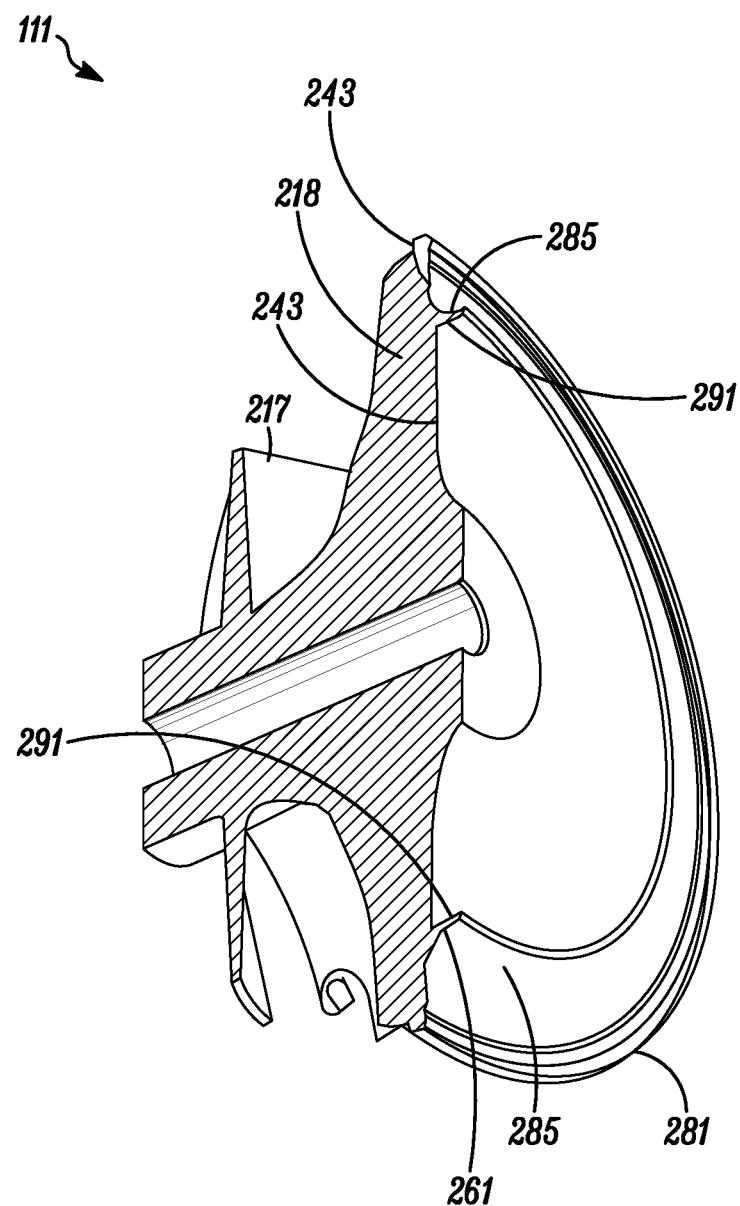
FIG. 6 is a cross-sectional perspective view of the turbine wheel depicted in FIG. 4.

With reference to FIGS. 1-6, as is depicted in prior art FIG. 1 (using comparable reference numbers), the rotor of the present embodiment also includes a radial turbine wheel 111 located substantially within a turbine housing 105, a radial compressor wheel 113 located substantially within a compressor housing 107, and a shaft 115 extending along an axis of rotor rotation 103, through a center housing 109 (having axial and radial bearings), to connect the turbine wheel to the compressor wheel and provide for the turbine wheel to drive the compressor wheel in rotation around the axis of rotor rotation. In other embodiments, the turbine wheel might not be a purely radial turbine wheel, but is still a radially directed turbine wheel. For the purposes of this application, the term "radially directed", when used regarding a wheel, is defined to mean the wheel has a significant radial component (i.e., it is either a radial wheel or a mixed flow wheel that is primarily a radial wheel).

The turbine housing 105 and turbine wheel 111 form a turbine configured to circumferentially receive a high-pressure and high-temperature exhaust gas stream from an exhaust manifold of the engine (such as the exhaust gas stream 121 from the exhaust gas manifold 123, as depicted in FIG. 1). The turbine wheel (and thus the rotor) is driven in rotation around the axis of rotor rotation 103 by the high-pressure and high-temperature exhaust gas stream arriving through a scroll 216 acting on a plurality of blades 217 mounted on a hub 218 of the turbine wheel. The exhaust gas stream becomes a lower total pressure exhaust gas stream while passing through the blades, and is subsequently axially released via a turbine outlet into an exhaust system (not shown). Thus, the turbine is configured to receive a pressurized exhaust gas stream (e.g., from an engine) and to convert its total energy into mechanical kinetic energy (e.g., to drive a compressor).

Like the prior art described for FIG. 1, the compressor housing 107 and compressor wheel 113 form a radial compressor. The compressor wheel, being driven in rotation by the exhaust-gas driven turbine wheel 111 (via the shaft 115), is configured to compress axially received input air (e.g., ambient air, or already-pressurized air from a previous-stage in a multi-stage compressor) into a pressurized air stream that may be ejected circumferentially from the compressor and sent on to an engine inlet (such as pressurized air stream 133 that is sent on to the engine inlet 139, as depicted in FIG. 1).

Turbine Wheel Fluid Recirculation System

The turbine hub 218 has a blade-side surface 251 that aligns with a housing wall 253 upstream from an inducer to provide for the smooth flow of exhaust gas into the turbine. Nevertheless, a small axially-extending radial wheel-gap 255, that extends axially from between the blade-side surface 251 and the housing wall 253, allows a small amount of flow between inlet exhaust gas 256 and the area behind the hub (on the opposite side of the hub from the blade-side surface).

The turbine hub 218 defines a turbine-wheel back-disk surface 243 facing the housing. The housing defines a turbine-end wall 239 having a turbine-end-wall outer surface 241 facing the turbine hub. A turbine-wheel back-disk cavity 245 is defined between the turbine-wheel back-disk surface and the turbine-end-wall outer surface. The turbine-wheel back-disk surface rotates with the shaft, while the turbine-end-wall outer surface remains stationary with respect to the housing.

The pressure in the back-disk cavity 245 can affect the operation of the turbine. Of particular importance, unbalanced pressures across a wheel can lead to excessive axial loads being placed on axial bearings. Lower axial loads help in better methods of designing systems, as they lead to better choices of bearing systems and improved bearing life. They also lead to simplified sealing arrangements between bearings and the back disc of the turbine wheel.

With an excessively high pressure, excessive axial forces are placed on the axial bearings. It is thus known to vent a turbine-wheel back-disk cavity to reduce excess pressure.

With a pressure that is too low, axial loads are also generated, and oil leaks may occur. More particularly, on a distal end, a turbine-end portion 249 of the shaft 115 is attached to the turbine wheel hub 218. A proximal end of the turbine-end portion of the shaft extends through a bore in the center-housing turbine-end wall 239, and extends into the center housing 109. Within that bore, a turbine-side oil seal is formed. This oil seal is relied upon to prevent the flow of bearing oil out of the center housing 109, into the turbine-wheel back-disk cavity 245, and subsequently out to foul the turbine blades with burnt oil, bleeding off oil required for bearing operation.

Nevertheless, undesirable axial loads and oil leaks through the turbine-side oil seal are possible in situations where there is a negative pressure gradient across the turbine-side oil seal (i.e., there is a lower pressure at the turbine side of the oil seal than there is at adjoining locations within the center housing 109). One factor that can contribute to such a negative pressure gradient across the turbine side oil seal is the turbine operating at a low expansion ration (e.g., from 1.0 to 2.0). In such operating conditions, pressure in the turbine-wheel back-disk cavity 245 tends to be very low due to the fundamental energy exchange within the turbine.

Another factor that can contribute to such a negative pressure gradient across the turbine side oil seal is a high circumferential velocity within the turbine-wheel back-disk cavity 245. The presence of such a circumferential velocity means that a larger portion of the total pressure in the back-disk cavity is in the form of dynamic pressure rather than static pressure, contributing to a negative pressure gradient across the turbine side oil seal. There are other factors that can also contribute to a negative pressure gradient across the turbine side oil seal. For example, for a variable nozzle turbine (i.e., one with turbine inlet vanes), the pressure gradient may be smaller, particularly with the vanes set to a smaller opening.

To maintain an adequate, but not excessive pressure in the turbine-wheel back-disk cavity 245, the present embodiment includes several unique features. The first such feature is a ring-shaped primary axial protrusion 261 extending circularly around the turbine-wheel back-disk surface 243. This primary axial protrusion extends into a circular channel 263 in the housing, separating the back-disk surface 243 into an outer back-disk surface region 265 and an inner back-disk surface region 267. It likewise separates the turbine-wheel back-disk cavity 245 into an outer back-disk cavity 269 and an inner back-disk cavity 271.

In another feature, in the outer back-disk cavity 269 there are at least one, and preferably a plurality of ring-shaped secondary axial protrusions 281. These secondary axial protrusions typically extend from the outer back-disk surface region 265 toward the housing wall (although protrusions extending from the housing wall are possible in other embodiments). These protrusions form a labyrinth to break up smooth flow that could occur between the axially-extending wheel gap 255 and the circular channel 263 in the housing. This causes turbulence, and slows the radial portion of the flow that can occur through the outer back-disk cavity 269 between the axially-extending wheel gap 255 and the circular channel 263. This feature generates a pressure drop and reduces the operating fluid flow rate through the outer back-disk cavity 269 towards the circular channel 263.

The primary axial protrusion 261 is characterized by a concave radial-to-axial curved outer surface 285 making it a sloop-shaped protrusion surface. It should be understood that the concave radial-to-axial curved outer surface is concave when considered from circumferential view (i.e., the view of FIG. 3). This concave radial-to-axial curved outer surface 285 directs a radial component of fluid flow from the outer back-disk cavity 269, to change to an axial component (while still having a circumferential component). This encourages flow into a bypass 287 (i.e., a bypass passageway) rather than into the inner back-disk cavity 271. The bypass leads into a turbine outlet 288 downstream from an exducer, bypassing the turbine blades 217. Thus, this feature guides leaked fluid from labyrinth towards the bypass, which connects the back-disc region to a turbine exit helping to maintain the low pressures in the back-disc region.

The primary axial protrusion 261 is further characterized by a axially flat inner surface 291. It should be understood that the axially flat inner surface 291 is flat when considered from circumferential view (i.e., the view of FIG. 3). This axially flat inner surface 291 is conformingly received (while leaving a gap) within an interlocking step 293 formed in the housing wall that forms the circular channel 263. This conforming step further limits fluid flow between the bypass 287 and the inner back-disk cavity 271 (and thus the oil seal).

In another feature, the embodiment further has a relief flow valve 301 within (i.e., controlling flow through) the bypass. The valve is controlled by a controller 302 that is configured and/or programmed to maintain a constant positive pressure within the bypass in most of operating conditions helping to balance the axial load on the bearings.

This controller could operate using a local mechanical or computer-based control system, or could be operated by an ECU, as is the case for many systems in a vehicle. The constant positive pressure that is optimal for a given can be experimentally optimized for the operating range of expansion ratio. Typically, the valve opens above a cutoff pressure and closes below that cutoff pressure. Some possible cutoff pressures to be investigated could be between 1.1 and 1.5 bar (e.g., 1.3 bar), but every system needs to be individually investigated because its own parameters will vary from others.

Compressor Wheel Fluid Recirculation System

Figure 7:
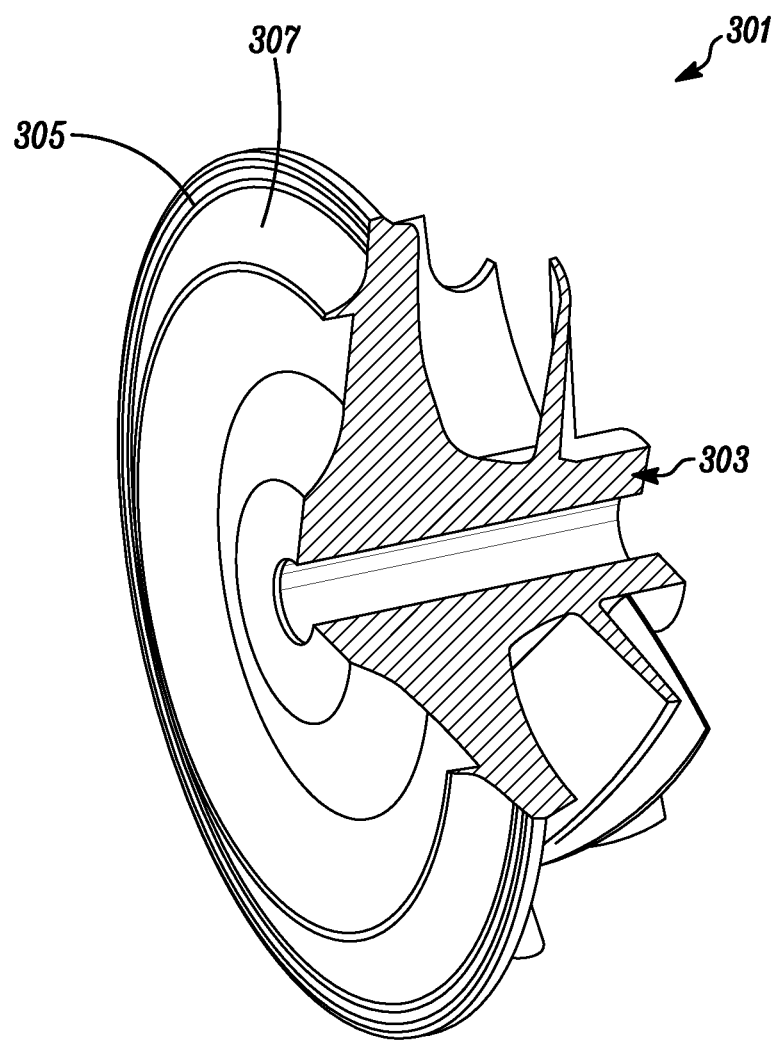
FIG. 7 is a cross-sectional perspective view of a compressor wheel under another embodiment of the invention.

While the elements of the invention have been described with respect to a turbine, in this case it should be understood that the invention is equally applicable to a compressor. With reference to FIG. 7, a compressor may have a radially directed compressor wheel 301 with a compressor hub 303 having a backside forming a labyrinth 305 at its outer edge, a scooped feature 307 redirecting flow, and a housing stepped feature interlocking with the scooped feature (similar to that depicted in FIG. 3 for a turbine wheel), wherein the labyrinth, the scooped feature and the stepped feature form an entry into a bypass that flows through a relief flow valve to a compressor inlet (which is similar to a turbine outlet in that it is typically of a much lower pressure).

It is to be understood that the invention comprises apparatus and methods for designing and producing turbochargers. Additionally, the various embodiments of the invention can incorporate various combinations of the features described above. In short, the above disclosed features can be combined in a wide variety of configurations within the anticipated scope of the invention.

While particular forms of the invention have been illustrated and described, it will be apparent that various modifications can be made without departing from the spirit and scope of the invention. For example, while the scroll was described as a radial scroll, the invention is also applicable to a mixed flow turbine. Also, while the described embodiments are for a turbocharger having both a compressor and a turbine, the invention could apply to turbine expanders having one-sided turbine architectures, and compressor's having one-sided compressor architectures. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A turbine configured to receive a pressurized exhaust gas stream, and to convert its total energy into mechanical kinetic energy, comprising:
   a housing forming a scroll directing the exhaust gas stream inward toward an axis of rotor rotation;
   a rotor rotatably mounted within the turbocharger housing to rotate around the axis of rotor rotation, the rotor including a radially directed turbine wheel and a shaft extending along the axis of rotor rotation, the shaft connecting the turbine wheel to bearings within a portion of the housing, wherein the turbine wheel is configured with a hub and a plurality of turbine blades, wherein the hub defines a blade-side surface, and wherein the hub forms an axially-extending wheel gap radially between the blade-side surface and the housing that allows a small amount of flow between inlet exhaust gas and the area behind the hub;

wherein the hub defines a turbine-wheel back-disk surface facing the housing, and the housing defines a turbine-end wall having an outer surface facing the hub, a turbine-wheel back-disk cavity being defined between the turbine-wheel back-disk surface and the turbine-end-wall outer surface;

wherein the hub forms a ring-shaped primary axial protrusion extending circularly around the turbine-wheel back-disk surface into a circular channel in the housing, the ring-shaped primary axial protrusion and the circular channel separating the back-disk surface into an outer back-disk surface region and an inner back-disk surface region, and separating the turbine-wheel back-disk cavity into an outer back-disk cavity and an inner back-disk cavity; and wherein the circular channel leads into a bypass that bypasses the turbine blades rather than into the inner back-disk cavity.

2. The turbine of claim 1, wherein in the outer back-disk cavity there are one or more ring-shaped secondary axial protrusions.

3. A turbocharger comprising the turbine of claim 2 and a compressor.

4. The turbine of claim 2, wherein the one or more secondary axial protrusions extend from the outer back-disk surface region toward the housing wall.

5. The turbine of claim 2, wherein the one or more secondary axial protrusions are a plurality of secondary axial protrusions.

6. A turbocharger comprising the turbine of claim 5 and a compressor.

7. The turbine of claim 1, wherein the primary axial protrusion is characterized by a concave radial-to-axial curved outer surface.

8. A turbocharger comprising the turbine of claim 7 and a compressor.

9. The turbine of claim 7, wherein the primary axial protrusion is characterized by an axial inner surface that is conformingly received within an interlocking step formed in the housing wall that forms the circular channel.

10. A turbocharger comprising the turbine of claim 9 and a compressor.

11. The turbine of claim 1, wherein the primary axial protrusion is characterized by an axial inner surface that is conformingly received within an interlocking step formed in the housing wall that forms the circular channel.

12. A turbocharger comprising the turbine of claim 11 and a compressor.

13. The turbine of claim 1, and further comprising a relief flow valve in the bypass, the relief flow valve being controlled by a controller maintaining a constant positive pressure throughout most of operating conditions of the turbine.

14. The turbine of claim 13, wherein the controller of the relief flow valve in the bypass opens the relief flow valve when the bypass pressure within the bypass is above a cutoff pressure, and closes the relief flow valve when the bypass pressure is below the cutoff pressure.

15. A turbocharger comprising the turbine of claim 14 and a compressor.

16. A turbine configured to receive a pressurized exhaust gas stream, and to convert its total energy into mechanical kinetic energy, comprising:

a housing forming a scroll directing the exhaust gas stream inward toward an axis of rotor rotation;

a rotor rotatably mounted within the turbocharger housing to rotate around the axis of rotor rotation, the rotor including a radially directed turbine wheel and a shaft extending along the axis of rotor rotation, the shaft connecting the turbine wheel to bearings within a portion of the housing, wherein the turbine wheel is configured with a hub and a plurality of turbine blades, the hub defining a turbine-wheel back-disk surface facing the portion of the housing containing the bearings, wherein the hub defines a blade-side surface, and wherein the hub forms an axially-extending wheel gap radially between the blade-side surface and the housing that allows a small amount of flow between inlet exhaust gas and the area behind the hub; and a relief flow valve;

wherein the housing defines a turbine-end wall having an outer surface facing the hub, a turbine-wheel back-disk cavity being defined between the turbine-wheel back-disk surface and the turbine-end-wall outer surface;

wherein the housing forms a bypass open to the turbine-wheel back-disk cavity;

wherein the relief flow valve controls flow through the bypass, the relief flow valve being controlled by a controller maintaining a constant positive pressure throughout most of operating conditions of the turbine;

wherein the controller of the relief flow valve in the bypass opens the relief flow valve when the bypass pressure within the bypass is above a cutoff pressure, and closes the relief flow valve when the bypass pressure is below the cutoff pressure.

* * * * *